(12) United States Patent
McCormick

(10) Patent No.: US 11,488,046 B2
(45) Date of Patent: Nov. 1, 2022

(54) METHOD AND APPARATUS FOR SUPPORTING ESTIMATION OF LINK ACQUISITION TIME IN SATELLITE-BASED NETWORKS

(71) Applicant: William Carson McCormick, Ottawa (CA)

(72) Inventor: William Carson McCormick, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 16/896,285

(22) Filed: Jun. 9, 2020

(65) Prior Publication Data

US 2021/0382178 A1    Dec. 9, 2021

(51) Int. Cl.
*G06N 7/00* (2006.01)
*H04B 10/118* (2013.01)

(52) U.S. Cl.
CPC ........... *G06N 7/005* (2013.01); *H04B 10/118* (2013.01)

(58) Field of Classification Search
CPC ........ G06N 7/00; G06N 7/005; H04B 10/118; H04B 7/185–195
See application file for complete search history.

(56) References Cited

U.S. PATENT DOCUMENTS

| | | | |
|---|---|---|---|
| 7,809,661 B2 * | 10/2010 | D'Ambrosio | G06Q 30/02 706/45 |
| 10,264,509 B2 * | 4/2019 | Torres | H04W 40/20 |
| 10,305,721 B1 * | 5/2019 | Binns | H04L 67/61 |
| 2003/0137930 A1 | 7/2003 | Futernik | |
| 2008/0191936 A1 | 8/2008 | Phatak et al. | |
| 2013/0203343 A1 * | 8/2013 | Ling | H04N 21/441 455/12.1 |
| 2017/0272149 A1 * | 9/2017 | Michaels | G01S 5/0081 |
| 2017/0324465 A1 * | 11/2017 | Sotom | H04B 10/40 |
| 2018/0098248 A1 * | 4/2018 | Torres | H04L 47/762 |
| 2018/0138968 A1 * | 5/2018 | Auer | H04B 7/18515 |

FOREIGN PATENT DOCUMENTS

| | | |
|---|---|---|
| CN | 103674032 A | 3/2014 |
| CN | 109946727 A | 6/2019 |
| CN | 110300059 A | 10/2019 |

* cited by examiner

*Primary Examiner* — Raymond S Dean

(57) ABSTRACT

The present invention provides a method and apparatus for supporting estimation of inter-satellite link acquisition times in a satellite constellation. The method includes computing or generating an indication of a statistical model based on observations for prior link acquisition times. The method further includes communicating an indication such as a statistical model for link acquisition times or related parameters through a communication network, or a combination thereof. The indication may be communicated using one or more transmission techniques or protocols, such as flooding, a link state protocol or gossip protocol. Based on the disseminated indication, future link acquisition times can be predicted by satellites in the satellite constellation. Embodiments of the invention use a statistical-based computation approach, such as regression modelling or random variable modelling, to estimate link acquisition times or associated modelling, to estimate link acquisition times or associated estimation parameters. The estimates or associated estimation parameters may then be disseminated through the constellation.

24 Claims, 5 Drawing Sheets

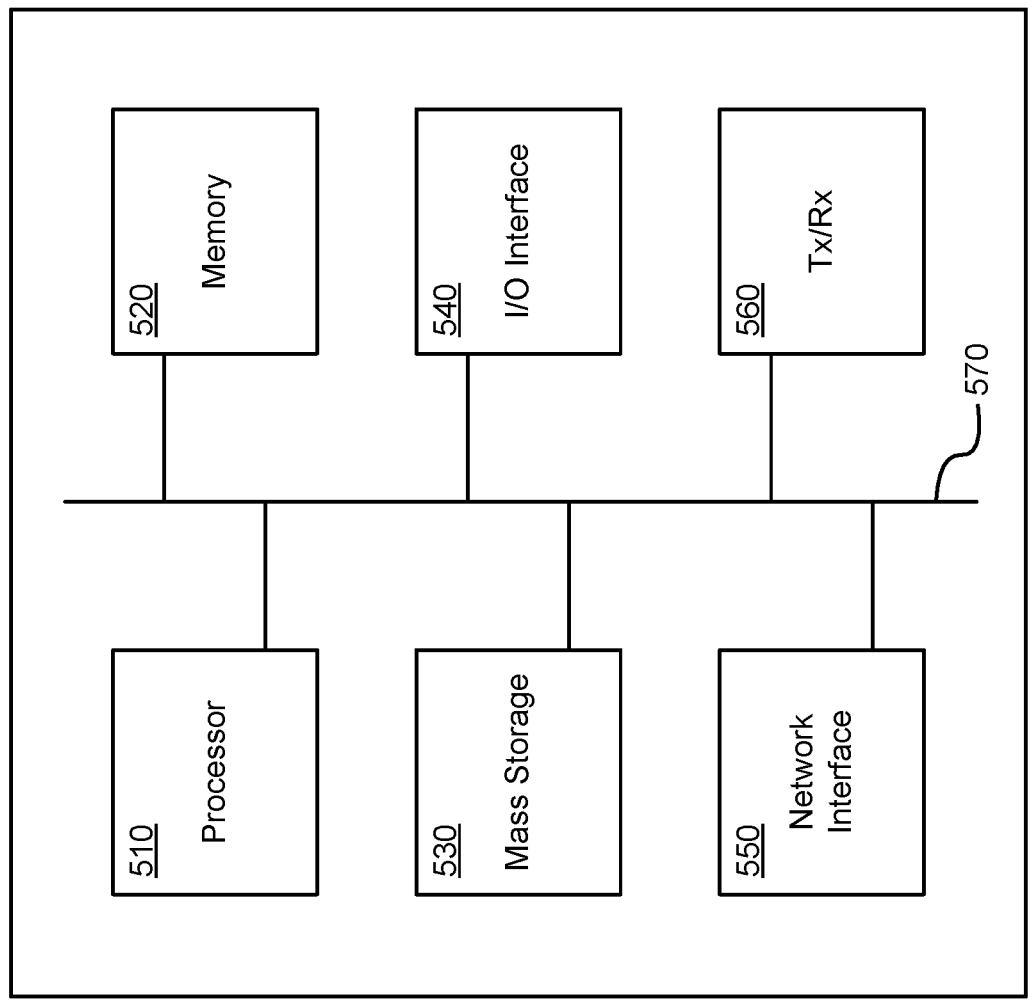

METHOD AND APPARATUS FOR SUPPORTING ESTIMATION OF LINK ACQUISITION TIME IN SATELLITE-BASED NETWORKS

CROSS-REFERENCE TO RELATED APPLICATIONS

This is the first application filed for the present invention.

FIELD OF THE INVENTION

The present invention pertains to satellite-based networks, such as optical satellite mesh networks, and in particular to a method and apparatus for estimating acquisition times for satellite links in such networks, and for disseminating related information through the network.

BACKGROUND

Low earth orbit (LEO) satellite constellations are being developed to provide, among other things, Internet routing services. A LEO constellation can be thought of as a group of satellites distributed in space so that they can be organized into a mesh network. Free space optical (i.e. laser) links can be used to provide inter-satellite links (ISLs). A LEO constellation with both ISLs and terrestrial links can be used to provide high-bandwidth network. Other types of ISLs, such as radio frequency (RF) or microwave-based links are also possible. One of the technical issues with ISLs in polar orbit LEO constellations is that inter-satellite links periodically experience signal loss due to the relative motion of the satellites in the constellation. This occurs for example when satellite orbits cross (e.g. at or near the poles), and the east-west links are swapped. Other examples occur at the seam of a polar orbit constellation and in the east-west links for constellations with orbits tilted away from the poles (e.g. Walker Delta constellations). The seam refers for example to a boundary such that, on one side of the boundary are satellites in one of two counter-rotating hemispheres or spheres, and on the other side of the boundary are satellites in the other one of the two counter-rotating hemispheres or spheres. Communication links between satellites in different ones of the two counter-rotating hemispheres or spheres cross the seam.

Reacquiring an inter-satellite link after a loss of connectivity can be a time-consuming process. In the current literature, current optical link acquisition time (e.g. spatial acquisition time) is estimated to range from 10 to 60 seconds. Most of this time is due to the need for spatial acquisition operations, in which communication lasers on adjacent satellites are aimed correctly at respective receivers.

Because link acquisition times are relatively long in the context of the life of the link in many situations, link outages are impactful to network operations. Therefore, there is a need to for a method and apparatus for estimating link acquisition times and disseminating related information through the network, so that the impact of link outages can be mitigated.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for supporting estimation of inter-satellite link acquisition times in a satellite constellation. The method and apparatus is provided for estimating satellite communication link acquisition times, for disseminating information such as link acquisition times or related parameters through a communication network, or a combination thereof. Embodiments of the invention use a statistical-based computation approach to estimate link acquisition times or associated estimation parameters. The estimates or associated estimation parameters may then be disseminated through the constellation. The estimation of the inter-satellite link acquisition times can be performed locally, remotely or a combination thereof.

In accordance with embodiments of the present invention, there is provided a method for supporting the estimation of inter-satellite link acquisition times in a satellite constellation. The method may be performed by a suitable device, such as a computing and communication device of a first satellite of the satellite constellation. The method includes determining an indication of a statistical model. The indication may be determined based on observations involving prior inter-satellite link acquisitions by the first satellite. The statistical model is configured to estimate future inter-satellite link acquisition times involving the first satellite. The method further includes communicating the indication of the statistical model toward one or more other satellites in the satellite constellation. The indication may then be used by the one or more other satellites or one or more other network entities to operate the statistical model for estimating the future inter-satellite link acquisition times involving the first satellite.

In accordance with embodiments of the present invention, there is provided an apparatus of a satellite of a satellite constellation for supporting estimation of inter-satellite link acquisition times in the satellite constellation. The apparatus includes suitable computing electronics such as a processor and a memory storing machine executable instructions. The apparatus is configured, for example by configuration of the instructions, to compute an indication of a statistical model and to communicate the indication of the statistical model. The computing is based on observations involving prior inter-satellite link acquisitions by the satellite. The statistical model is configured to estimate future inter-satellite link acquisition times involving the satellite. The indication of the statistical model is communicated toward one or more other satellites in the satellite constellation. The indication may then be used by the one or more other satellites or one or more other network entities to operate the statistical model for estimating the future inter-satellite link acquisition times involving the satellite.

In accordance with embodiments of the present invention, there is provided an apparatus for supporting estimation of inter-satellite link acquisition times in the satellite constellation. The apparatus includes suitable computing electronics such as a processor and a memory storing machine executable instructions. The apparatus is configured, for example by configuration of the instructions, to receive an indication of a statistical model and to operate the statistical model. The statistical model is computed based on observations involving prior inter-satellite link acquisitions by a remote satellite. The statistical model is configured to estimate future inter-satellite link acquisition times involving the remote satellite. Operating the statistical model is performed, using the indication, for estimating said future inter-satellite link acquisition times involving the remote satellite.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 5 illustrates, in a schematic diagram, an electronic device in accordance with embodiments of the present invention.

It will be noted that throughout the appended drawings, like features are identified by like reference numerals.

DETAILED DESCRIPTION

As used herein, the term "about" should be read as including variation from the nominal value, for example, a +/−10% variation from the nominal value. It is to be understood that such a variation is always included in a given value provided herein, whether or not it is specifically referred to.

Figure 1:
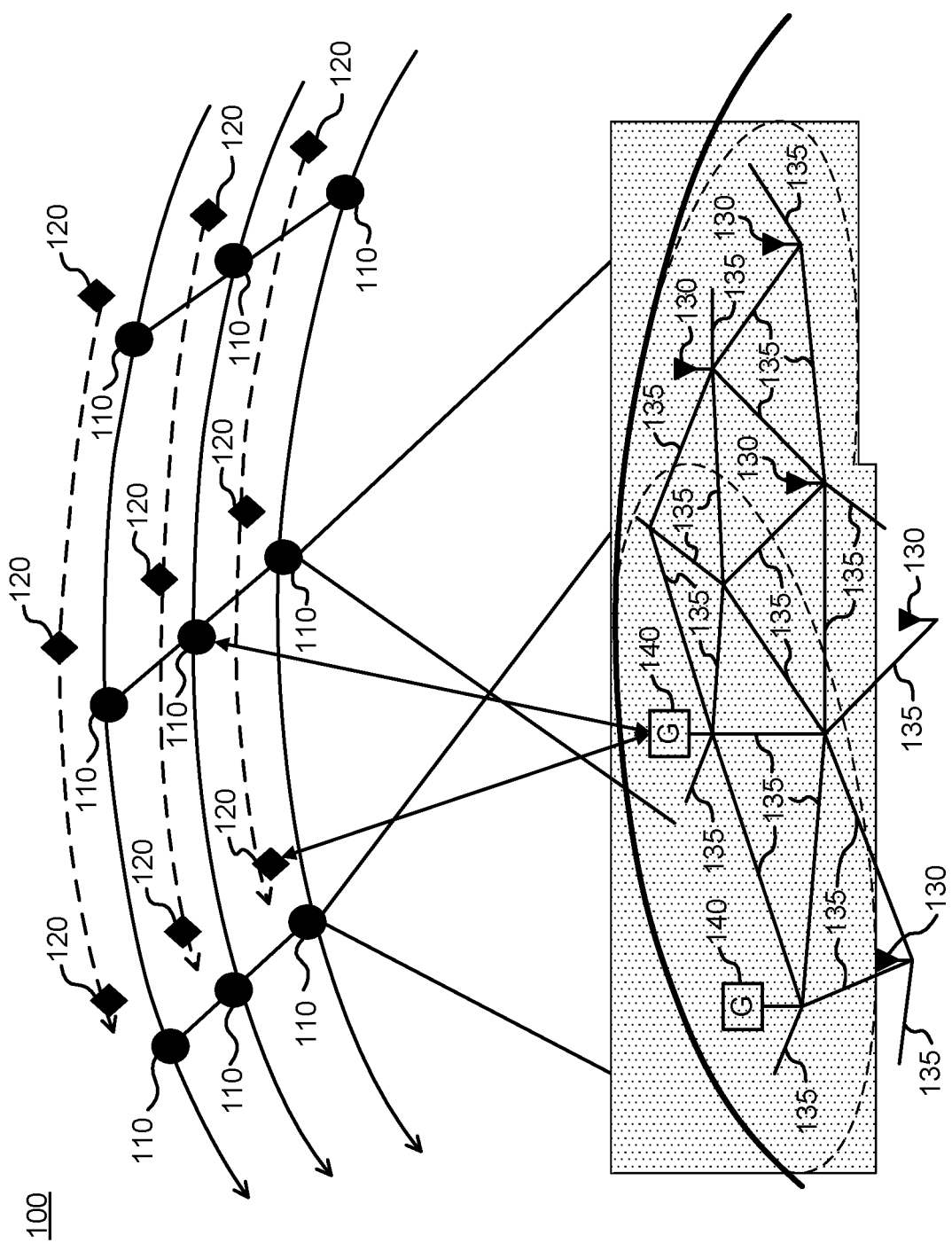
FIG. 1 illustrates an example of a satellite network integrated with a terrestrial network.

FIG. 1 illustrates an example of a satellite network integrated with terrestrial network. Referring to FIG. 1, there is provided a satellite network 100 integrated with terrestrial network. The satellite network 100 includes LEO satellites 110 and 120 in a satellite constellation. The LEO satellites 110 and 120 may be placed into different orbits. The LEO satellites 110 and 120 can be interconnected by optical crosslinks. The LEO satellites 110 and 120 are connected to terrestrial user terminals. Optical fiber 135 and wireless networks 130 interconnect with the satellites via gateways 140 forming a global heterogeneous network. Data networks based on such LEO constellation topologies illustrated in the figure can provide data networking services, especially in areas of poor or congested terrestrial infrastructure deployment.

Low earth orbit (LEO) satellite constellations are capable of providing, among other things, internet routing services. To provide internet routing services, link state routing is the dominantly used as the interior gateway routing method in satellite network operations as the link state routing takes condition of network link into consideration when performing routing computation.

Satellite links can be occasionally or periodically interrupted due for example to operational problems or satellite position. Re-acquisition of interrupted links is then required. Because links cannot be used during their acquisition, it is useful for other satellites in a constellation or network to be informed of the time that link acquisition is completed or expected to be completed. This assists such satellites in correctly making routing decisions involving the link subject to re-acquisition.

Existing approaches such as U.S. Patent Application Publication No. 2003/0137930 provide methods and apparatuses for routing information in satellite (communication) networks. Some existing approaches uses satellite ephemeris data to predict link state changes in the satellite mesh or constellation in which the LEO satellites are organized. The satellite ephemeris data may include information relating to the satellite trajectory, such as the satellite locations (or velocities) over time, and information relating to state of the satellites.

In existing approaches, it is proposed to use almanac data for the network nodes (e.g. satellites) which are not adjacent to (e.g. are remotely situated from) the satellite link that changes its state, in order to predict the satellite link state changes. The almanac data may include coarse orbit and status information for each satellite in the satellite constellation. The network nodes adjacent to the satellite link changing its state, on the other hand, suppress updating the link state thereof.

In embodiments, almanac data may refer to information regarding operational information for satellites in a constellation. The operational information may include orbital (e.g. position and velocity) information, satellite state information, coarse communication link capabilities information, etc.

This approach is proposed with the intention to avoid constant floods of link state updates where the link state changes are predictable. Regarding the link state changes, prior art do not take into account the stochastic nature of satellite link acquisition as they consider the link state updates to occur due to known movement of satellites.

Figure 2:
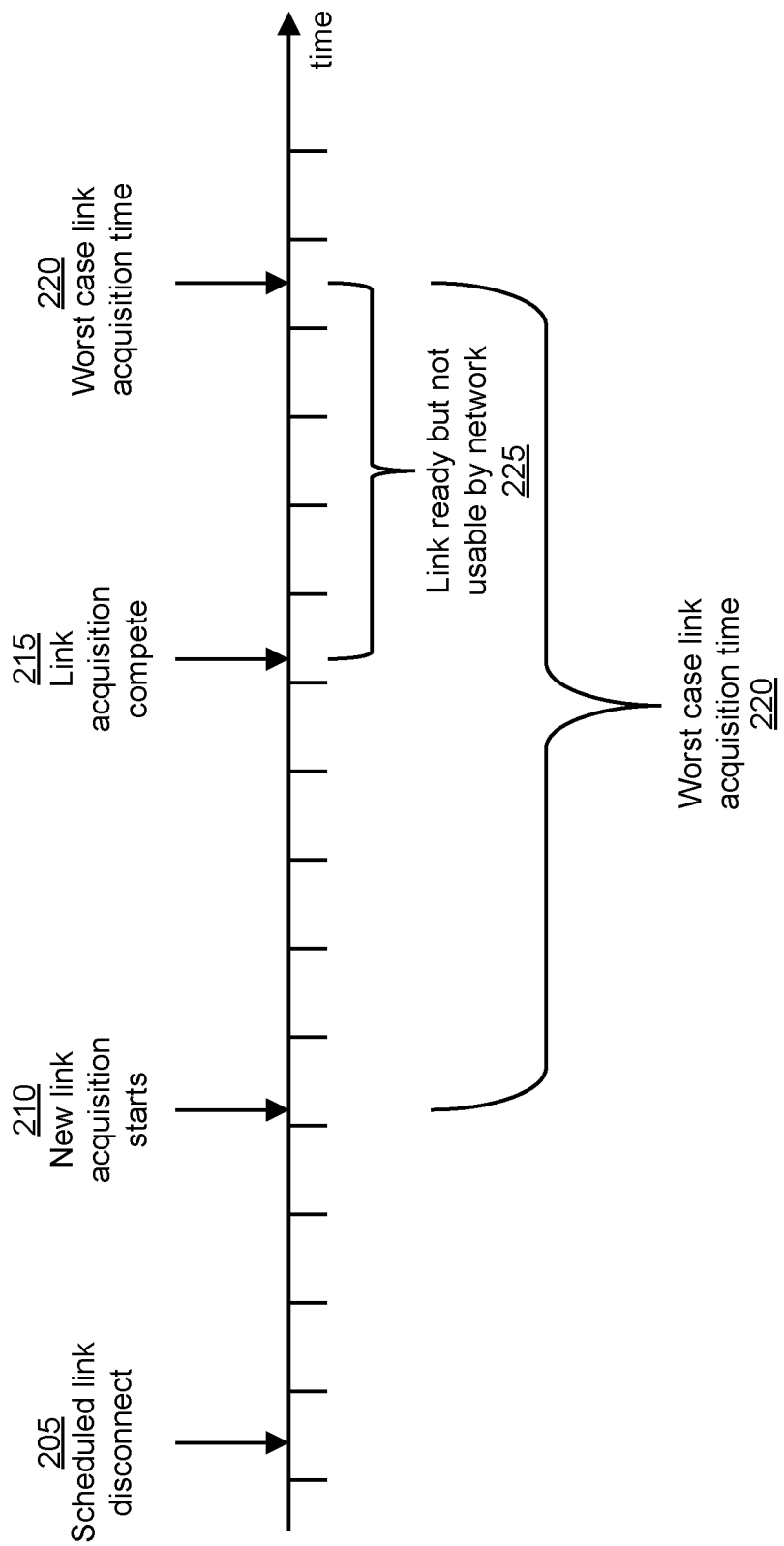
FIG. 2 illustrates unpredictability of link acquisition times in the satellite network and its potential impact to network operations.

However, link state changes cannot always be predicted easily. This is because link acquisition times can vary over relatively wide range and therefore are unpredictable, as is illustrated in FIG. 2. Further, satellite emulators generally model link acquisition times as a random variable. This makes harder to predict when the link will be up. FIG. 2 illustrates unpredictability of link acquisition times in the satellite network and its potential impact to network operations. In particular, FIG. 2 illustrates a time 205 at which a link disconnects, and a time 210 at which a new link acquisition operation starts. Although the worst case link acquisition time 220 may be known and predictable, the actual link acquisition time 215 is not necessarily predictable, other than knowing that it is before the worst case time 220. In the time 225 between the actual link acquisition time 215 and the worst-case time 220, the link is ready for use but is not usable, because the network is configured to wait until the worst case time 220 before using the link.

However, simply using worst link acquisition time is not a desire\able option, as it will reduce network throughput and utilization. Referring FIG. 2, use of the worst-case link acquisition time can cause unnecessary delay throughout the network (e.g. link is ready but not usable by the network), especially when the link is reacquired earlier than the worst link acquisition time. On the other hand, if the link reacquisition is prematurely declared, the premature declaration may result in routing black holes, packet loss and its follow on effects.

According to various embodiments, computing equipment associated with (e.g. on board) a satellite can be used to record a history of link acquisition times (e.g. prior link acquisition times), potentially along with related information. The related information can include, for example, absolute satellite position, relative satellite position with respect to other satellites, time, distance, location and/or velocity of the satellite, distance, location and/or velocity of a satellite at a far end of the link, etc. In some embodiments, computing equipment associated with a satellite may be located remotely from the satellite while communicatively connected thereto.

The history (e.g. prior link acquisition times) can be used to estimate future link acquisition times. In some cases the estimates can be substantially independent of other observations. For example, if link acquisition times are historically approximately Gaussian distributed with a mean of $\mu$ and a variance $\sigma^2$, then the link acquisition time can be estimated according to such a distribution. For example, the link acquisition time can be estimated to be less than or equal to $\mu+2\sigma^2$ with probability of about 0.9545 according to standard statistical analysis. In some cases, the estimates can depend on other observations. For example, the history can be processed to infer that the link acquisition times are distributed according to a certain probability distribution which has parameters that are a function of one or more other observables such as satellite position (e.g. absolute position of the satellite or relative position of the satellite with respect to other satellite) and inter-satellite distance. Accordingly, the link acquisition time can be estimated according to such a distribution, taking into account current values for such observables.

More generally, the history can be used to determine an indication of a model that can be used to estimate future link acquisition times involving a given satellite. The indication can be the model itself or parameters of the model. The model generally refers to a statistical model, which can involve one or more approaches such as regression, statistical filtering, maximum likelihood estimation, maximum a posteriori estimation, expectation maximization, hidden Markov models, or other approaches. The parameters can be parameters (e.g. mean and variance) of a statistical distribution, or state transition probabilities in a hidden Markov model, parameters describing random variable behaviour or correlations between variables, etc.

In some embodiments, each satellite will need to have a routing engine that makes routing decisions based on state of remote links (e.g. links not originating or terminating at the satellite in question) in the satellite network system. The state of a remote link is closely related to whether the remote link's link acquisition process has completed. Embodiments of the present invention provide for methods and apparatus for estimating the probability that a remote link has been re-acquired (e.g. completion of link acquisition) at a specific time and is operational after a link outage. This estimate can be used in making informed routing decisions.

According to various embodiments, satellite routing engines estimate link acquisition times in accordance with observation and computation. Related information (e.g. parameters of a statistical model) is then distributed through the constellation. Other satellites, upon receipt of the information, use this information to predict remote link acquisition times more accurately. It is noted that satellites do not necessarily need to predict local link acquisition times because these are observed directly. Those skilled in the art will appreciate that colloquial reference to a satellite instead of satellite routing engine may be used.

Figure 3:
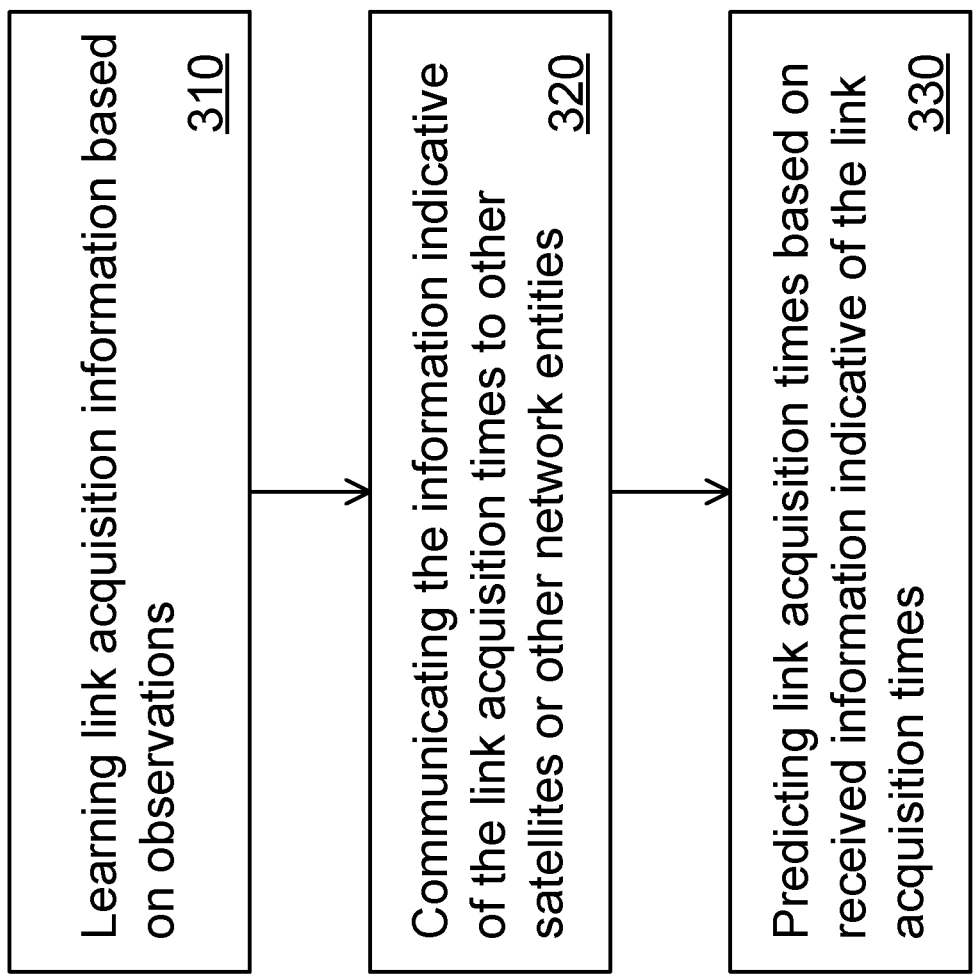
FIG. 3 illustrates, in a flow diagram, a method for supporting estimation of inter-satellite link acquisition times in a satellite constellation, in accordance with embodiments of the present invention.

FIG. 3 illustrates a method for supporting estimation of inter-satellite link acquisition times in a satellite constellation, in accordance with embodiments of the present invention. The method illustrated in FIG. 3 may be performed by one or more computing and communication devices of satellites in the satellite constellation. In some embodiments, the computing and communication devices may be integrated with thus part of the satellites. In some embodiments, the computing and communication devices may be separate from the satellites but communicatively connected thereto. Referring to FIG. 3, embodiments of the present invention involve a first satellite or other satellites learning 310 information indicative of link acquisition times based on observations. In at least one embodiment, a satellite, or the routing engine of the satellite, learns about link acquisitions associated with the links that originate or terminate with the same satellite. The link acquisition information can be carried in the form of a statistical model or parameters thereof. Embodiments further involve the first satellite or other satellites communicating 320 the information indicative of the link acquisition times (i.e. the indication of the statistical model for link acquisition times) to the first satellite or other satellites in the satellite constellation. Embodiments further involve, by the first satellite or other satellites, predicting 330 link acquisition times, for example based on received information indicative of the link acquisition times.

The observation may be performed by the first satellite or other network entities (e.g. network node, other satellites) remotely situated from the first satellite. If the observation is made by network entities other than the first satellite, then network entities are operatively or communicatively connected to the first satellite. In such cases, observation results acquired by the network entities other than the first satellite may be transmitted to the first satellite. The observation results may include link acquisition times involving the first satellite.

The information indicative of the link acquisition times can include link acquisition time estimates. The information indicative of the link acquisition times can include a statistical model or parameters thereof for use in estimating or predicting link acquisition times. The parameters can be statistical parameters (e.g. mean, variance, distribution type), model parameters (e.g. structure of a model used to estimate link acquisition times), etc.

Learning 310 the link acquisition information based on observations can include receiving or collecting the observations and processing the observations. The processing may also include computing an indication of a statistical model (for link acquisition times) based on the observations involving prior inter-satellite link acquisitions by the first satellite. The observation (or observation result) may include distance between satellites, absolute and relative satellite velocities, strength of the laser transmitter and others. In some embodiments the information may be specific to specific pairings of satellites. In various embodiments, the processing may be performed by the first satellite. In some embodiments, the processing may be performed by other network entities (e.g. one or more of other satellites, network entities of a terrestrial network) remotely situated from the first satellite. In such cases, observation results acquired by the first satellite may be transmitted to one or more network entities other than the first satellite so that the one or more network entities can perform the processing with the observation result received from the first satellite. The indication of the statistical model can include the statistical model itself or parameters of the statistical model. The processing can be based on statistical techniques, such as regression modelling, random variable modelling or other computational methods for estimating relationships among variables. For example, in some embodiments, regression modeling can be used to generate the statistical model for link acquisition times based on independent variables. The independent variables can indicate, for example, some or all of: distance between satellites; relative satellite velocities; and the strength of the laser transmitter.

In some embodiments, the link acquisition times can be treated as random variables which are modelled (e.g. using statistical modelling). In order to model the random variables (e.g. link acquisition times), statistical functions such as probability density functions can be used. Parameters of the statistical function (e.g. probability density function parameters) may be estimated using statistical inference techniques, such as maximum likelihood estimation, maximum a posteriori estimation, expectation maximization, hidden Markov models, or other techniques. For example, using maximum likelihood estimator, the values of parameters of the probability density function will be determined such that the values of the parameters maximize the output of the likelihood (or probability) function (i.e. parameter values that make the data most likely). The likelihood function can be expressed as $L=p(X|\Theta)$, where X represents sampled data set of link acquisition times, and $\Theta$ represents the parameters of the probability density function. Put another way, using maximum likelihood estimator, the probability density function parameters will be chosen such that the likelihood (i.e. L) of link acquisition times (i.e. X) is maximum. According to embodiments, the statistical model can specify a probability distribution for such random variables, such as truncated normal (Gaussian) distribution (truncated on the left), exponential distribution or other applicable probability distribution, with certain known or unknown parameters (e.g. distribution type, mean and variance).

Communicating 320 the information indicative of the link acquisition times (i.e. the indication of the statistical model for link acquisition times) can involve transmitting the statistical model for link acquisition times or parameters of such a statistical model. In various embodiments, the communicating 320 may be performed by the first satellite. In some embodiments, the communicating 320 may be performed by other network entities (e.g. one or more of other satellites, network entities of a terrestrial network) remotely situated from the first satellite. For instance, communicating 320 may be performed by network entities other than the first satellite when these network entities processed the observation results transmitted from the first satellite. In such case, the observation results may be processed as described above (e.g. processed the observation results based on statistical techniques, such as regression modelling, random variable modelling or other computational methods for estimating relationships among variables). In some embodiments, communicating may be the transmission of link acquisition information by the first satellite. This transmission may be directed to one or more neighboring satellites using inter-satellite links. In some embodiments, this transmission may be done using a ground link to a terrestrial node that can aggregate this information from a plurality of different satellites and re-distribute this information in any of a number of forms including as part of as an almanac.

According to embodiments, the indication of the statistical model can be communicated through one or more protocols. These can include flooding, link state protocols or gossiping protocols. In some embodiments, the indication may be communicated to other network nodes (e.g. the first satellite, other satellites or other network entities of a terrestrial network) using a flooding technique. In some embodiments, the flooding technique may be integrated with a link state protocol. In some embodiments, the indication may be communicated using gossip protocols. The gossip protocols may be similar to flooding technique but with reduced messaging. In some embodiments, the indication may be communicated to other network nodes (e.g. the first satellite, other satellites or other network entities of a terrestrial network) using entities (e.g. ground station) of the terrestrial network.

Once the indications of the statistical model for link acquisition times are communicated, a future link acquisition time involving the first satellite is predicted 330, for example based on received information indicative of the link acquisition times (i.e. the indication of the statistical model for link acquisition times). According to embodiments, the indication of the statistical model for link acquisition times may be used by the satellites (e.g. first satellite or other satellites) or other network entities (e.g. network entities of a terrestrial network) to operate the statistical model for estimating the future inter-satellite link acquisition times involving the first satellite. As such, the estimation of the future inter-satellite link acquisition times can be performed locally, remotely or a combination thereof. The remote estimation of the future acquisition times may include the estimation at least partly performed by entities of the terrestrial network (e.g. entities on the ground). Some embodiments may predict 330 the probability that the link acquisition is complete at a specific time using the indication of the statistical model. In various embodiments, predicting 330 may be performed by satellites other than the first satellite mentioned above in the satellite constellation. However, in some embodiments, predicting 330 can be also performed by the first satellite.

According to embodiments, the nominal link acquisition time may be determined based on the indication of the statistical model communicated in step 320 above. The indication can include the statistical model itself or parameters of the statistical model. The values of the parameters of the statistical model may be provided or determined in the course of performing step 310 above.

In one case, a satellite remotely situated from the satellite providing the indication of the statistical model may predict the future link acquisition time involving the first satellite using the indication of the statistical model such as a regression model. The indication may include the statistical model itself or parameters thereof. The remote satellite may determine a nominal link acquisition time using almanac data (e.g. coarse orbit and status information for each satellite (any satellites) in the satellite constellation). Then, the nominal link acquisition time may be adjusted using the indication of the statistical model.

In another case, a satellite remotely situated from the satellite providing the indication of the statistical model (e.g. the first satellite) may predict the probability that the link acquisition is complete using the indication of the statistical model such as random variable model. The indication may include the statistical model itself or parameters thereof. The remote satellite may determine a nominal link acquisition time based on the probability density function. For example, the nominal link acquisition time may be determined such that the probability for completion of an inter-satellite link acquisition (i.e. such that the link is ready to be used) is 0.9 (or some other suitably high value). The parameters of the probability density function may be estimated at step 310 above, using statistical inference techniques, such as maximum likelihood estimation, maximum a posteriori estimation, expectation maximization or hidden Markov models, or other techniques.

In some embodiments, the determined nominal link acquisition time may be communicated to the rest of the satellite network (e.g. other satellites in the satellite constellation, entities communicatively or operatively connected to satellites in the satellite constellation) as required.

It should be understood that a node remote to the first satellite, receive link acquisition information from the first satellite and a plurality of other satellites in repeated instances of step 330. When a route from the node is determined, the link acquisition time for a plurality of different links in the network can be used to determine a likelihood that a link will be available, and this information can be used in a path selection process.

Figure 4:
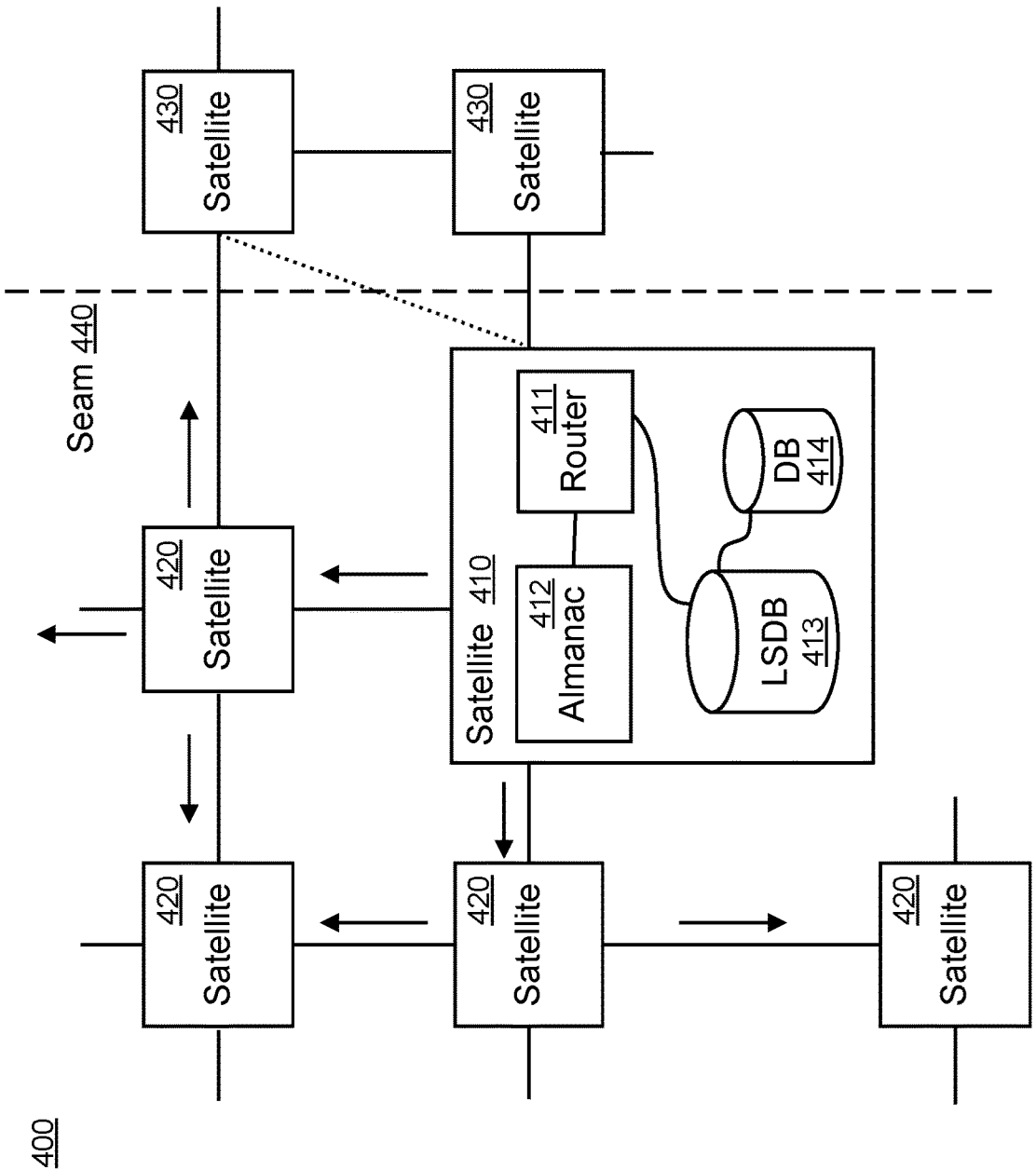
FIG. 4 illustrates, in a block diagram, a portion of a satellite constellation with a plurality of satellites connected together in a mesh network, in accordance with embodiments of the present invention.

FIG. 4 is a block diagram illustrating a portion of a satellite constellation 400 with a plurality of satellites connected together in a rectangular mesh, in accordance with embodiments of the present invention. Referring to FIG. 4, on the left side of the seam 440 are five satellites, denoted by general reference numbers 410 and 420, and on the right side of the seam 440 are two satellites 430. The seam 440 refers to a boundary dividing the satellites into two groups such that the satellites 410 and 420 are in one of two counter-rotating hemispheres and the satellites 430 are in the other one of two counter-rotating hemispheres. The satellites in each hemisphere are counter-rotating in opposite directions. The satellites 410, 420 and 430 may be operatively or communicatively connected to each other as illustrated in FIG. 4. Communication links between satellites in different ones of the two counter-rotating hemispheres (i.e. satellites 410, 420 vs. satellites 430) can cross the seam 440. Satellites can alternatively be arranged in other ways, for example in two or more counter-rotating spheres.

The satellite 410 may include a router 411, almanac function 412, link state database 413, and observation database 414. The router 411 may be a network interface that receives data from and transmits data to other satellites. The almanac function 412 may collect or provide almanac data such as coarse orbit and status information for each satellite in the satellite constellation. The link state database 413 may be operatively or communicatively connected to the router 411. The link state database 413 may hold information describing the satellite network topology, including current status of links in the network. The information stored in the link state database 413 may be in great detail such that the shortest path to a network node can be computed based on the most recent information available from the link state database 413. The observation database 414 may be part of the link state database 413 of the router 411 as shown in the figure. In some embodiments, the observation database 414 is not part of the link state database 413 but a separate database. While differently labelled, the satellites 420 and the satellites 430 have same or similar components as the satellite 410.

According to embodiments, the satellite 410 may observe inter-satellite link acquisitions and measure the link acquisition times as desired. The measured link acquisition times may be stored in the observation database 414. The link acquisition times saved in the observation database 414 may be retrieved to compute an indication of a statistical model (e.g. regression model). The statistical model may be configured to estimate future inter-satellite link acquisition times involving the satellite 410.

When the link acquisition times are retrieved from the observation database 414, the satellite 410 may compute or generate indication of a statistical model for link acquisition times. The indication of the statistical model can include a statistical model or parameters thereof for use in estimating or predicting link acquisition times. The parameters can include statistical parameters, such as mean link acquisition time, variance, distribution type, or more generally parameters of a probability distribution for a random variable representing a quantity such as but not limited to the link acquisition time. The parameters can include model parameters, such as the structure of a model used to estimate link acquisition times. Model parameters can indicate one or more variables, such as random variables to be predicted or (partially or fully) observable quantities. Observable quantities can include satellite positions, velocities, times, distances, laser strengths, signal strengths, etc. Model parameters can indicate causal or statistical relationships between such variables. For example, model parameters can indicate a numerical relationship between link acquisition time and observable quantities such as inter-satellite distances, satellite locations, velocities, and signal strengths. The numerical relationship can be represented in the form of a mathematical model such as a Bayesian network, a hidden Markov model, a stochastic equation or differential equation, etc.

According to embodiments, the link acquisition times may be modeled using one or more statistical techniques, such as regression modelling, random variable modelling and other computational methods. In some embodiments, the link acquisition times may be modeled as a function of the relative velocity of two satellites.

In some embodiments, parameters of the statistical model for link acquisition times may be computed using statistical inference techniques, such as maximum likelihood estimation, maximum a posteriori estimation, expectation maximization, hidden Markov models, or other techniques. For example, using maximum likelihood estimator, the values of parameters of the statistical model for link acquisition times will be determined such that the values of the parameters maximize the output of the likelihood (or probability) function (i.e. parameter values that make the data most likely). The likelihood function can be expressed as $L=p(X|\Theta)$, where X represents sampled data set of link acquisition times, and $\Theta$ represents the parameters of the statistical model. Put another way, using maximum likelihood estimator, the parameters of the statistical model will be chosen such that the likelihood (i.e. L) of link acquisition times (i.e. X) is maximum.

When the satellite 410 completes computing or generating the indication of the statistical model (e.g. regression model, random variable model) for the link acquisition time, the satellite 410 may communicate the indication to other satellites (e.g. satellites 420 and 430) in the satellite constellation. Again, the indication may include model parameters, for example. One or more routing techniques or transmission protocols may be used when forwarding the statistical model to the satellites 420 and 430. Potential routing techniques or transmission protocols include flooding, a link state protocol and gossip protocol. In some embodiments, the flooding technique may be integrated with a link state protocol. In some embodiments, the statistical model may be communicated or disseminated to other satellites (e.g. satellites 420 and 430) as part of link state protocol data unit (PDU) message.

When the satellites 420 and 430 receive the indications of the statistical model for link acquisition times, these satellites may rebuild and execute the statistical model using the received indications in order to estimate when the links involving the satellite 410 will compute their link acquisition phase. For that, the satellites 420 and 430 may predict future link acquisition times for the links involving the satellite 410. In some embodiments, the satellites 420 and 430 may predict the probability that the link acquisition involving the satellite 410 is complete at a specific time using the indication of the statistical model.

According to embodiments, the satellites 420 and 430 may use almanac data (e.g. coarse orbit and status information for each satellite in the satellite constellation) provided by their almanac function (i.e. component equating to the almanac function 412) to determine the nominal link acquisition time. The nominal link acquisition time may be adjusted using the indication of the statistical model to acquire the future link acquisition time involving the satellite 410.

When future link acquisition time or the probability for completion the link acquisition is estimated, the satellites 410, 420 and 430 may use these data to update their local link state database (e.g. link state database 413). The satellites 410, 420 and 430 may also trigger new routing computations based on these data.

FIG. 5 is a schematic diagram of an electronic device 500 that may perform any or all of operations of the above methods and features explicitly or implicitly described herein, according to different embodiments of the present invention. For example, a computer equipped with satellite or network function may be configured as electronic device 500.

As shown, the device includes a processor 510, such as a Central Processing Unit (CPU) or specialized processors such as a digital signal processor (DSP) or other such processor unit, memory 520, non-transitory mass storage 530, I/O interface 540, network interface 550, and a transceiver 560, all of which are communicatively coupled via bi-directional bus 570. According to certain embodiments, any or all of the depicted elements may be utilized, or only a subset of the elements. Further, the device 500 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 520 may include any type of non-transitory memory such as static random access memory (SRAM), dynamic random access memory (DRAM), synchronous DRAM (SDRAM), read-only memory (ROM), any combination of such, or the like. The mass storage element 530 may include any type of non-transitory storage device, such as a solid state drive, hard disk drive, a magnetic disk drive, an optical disk drive, USB drive, or any computer program product configured to store data and machine executable program code. According to certain embodiments, the memory 520 or mass storage 530 may have recorded thereon statements and instructions executable by the processor 510 for performing any of the aforementioned method operations described above.

Embodiments of the present invention provide advantages in operating satellite network system. For instance, embodiments allow the satellite network system to avoid using open loop estimates of link acquisition time. This can reduce network downtime due to signal loss on satellite network links thereby enhancing network throughput and utilization. In light of stochastic nature of satellite link acquisition, without the proposed method and embodiments each satellite may take very conservative approaches for estimating when a remote inter-satellite link will be re-acquired or will be available for use.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for supporting estimation of inter-satellite link acquisition times in a satellite constellation, comprising, by a computing and communication device of a first satellite of the satellite constellation:
   determining an indication of a statistical model based on observations involving prior inter-satellite link acquisitions by the first satellite, the statistical model configured to estimate future inter-satellite link acquisition times involving the first satellite; and
   communicating the indication of the statistical model toward one or more other satellites in the satellite constellation, the indication used by the one or more other satellites or one or more other network entities to operate the statistical model for estimating said future inter-satellite link acquisition times involving the first satellite.

2. The method of claim 1, wherein the communicated indication contains information to enable the one or more other satellites to estimate the future inter-satellite link acquisition times.

3. The method of claim 2, wherein said estimating the future inter-satellite link acquisition times is based on data related to the first satellite, a remote satellite or the one or more other satellites in the satellite constellation, and wherein the data related to the first satellite, the remote satellite or the one or more other satellites includes almanac data.

4. The method of claim 1, wherein the one or more other satellites estimate, based on the indication, a probability for completion of an inter-satellite link acquisition involving the first satellite at a specific time.

5. The method of claim 1, wherein the indication includes the statistical model itself.

6. The method of claim 1, wherein the indication includes one or more parameters of the statistical model.

7. The method of claim 6, wherein the parameters include one or both of: parameters of a probability distribution for a random variable; and causal or statistical relationships between random variables, observable quantities, or a combination thereof.

8. The method of claim 1, wherein the indication of the statistical model is communicated using one or more of flooding, a link state protocol, gossip protocol and link stated Protocol Data Unit (PDU) message.

9. The method of claim 1, wherein the indication is computed using one or more statistical inference methods.

10. The method of claim 9, wherein the one or more statistical inference methods include regression analysis, regression modelling, random variable modelling, maximum likelihood estimation (MLE), maximum a posteriori (MAP), expectation maximization (EM) and hidden Markov model.

11. The method of claim 1, wherein communicating the indication further comprises transmitting the indication to a node in a terrestrial network.

12. The method of claim 1, wherein the inter-satellite link is between the first satellite and a second satellite placed into a same orbit as the first satellite, or wherein the inter-satellite link is between the first satellite and a second satellite placed into a different orbit from the first satellite, or wherein the inter-satellite link is between the first satellite and a second satellite communicating with the first satellite across a seam.

13. An apparatus of a satellite of a satellite constellation for supporting estimation of inter-satellite link acquisition times in the satellite constellation, the apparatus comprising:
   a processor; and
   a memory storing machine executable instructions, the instructions when executed by the processor configure the apparatus to:
      compute an indication of a statistical model based on observations involving prior inter-satellite link acquisitions by the satellite, the statistical model configured to estimate future inter-satellite link acquisition times involving the satellite; and
      communicate the indication of the statistical model toward one or more other satellites in the satellite constellation, the indication used by the one or more other satellites or one or more other network entities to operate the statistical model for estimating said future inter-satellite link acquisition times involving the satellite.

14. The apparatus of claim 13, wherein the indication includes the statistical model itself.

15. The apparatus of claim 13, wherein the indication includes one or more parameters of the statistical model.

16. The apparatus of claim 15, wherein the parameters include one or both of: parameters of a probability distribution for a random variable; and causal or statistical relationships between random variables, observable quantities, or a combination thereof.

17. The apparatus of claim 13, wherein the indication of the statistical model is communicated using one or more of flooding, a link state protocol, gossip protocol and link stated Protocol Data Unit (PDU) message.

18. The apparatus of claim 13, wherein the indication is computed using one or more statistical inference methods.

19. The apparatus of claim 18, wherein the one or more statistical inference methods include regression analysis, regression modelling, random variable modelling, maximum likelihood estimation (MLE), maximum a posteriori (MAP), expectation maximization (EM) and hidden Markov model.

20. The apparatus of claim 13, wherein the indication is communicated at least partly through terrestrial network.

21. An apparatus for supporting estimation of inter-satellite link acquisition times in the satellite constellation, the apparatus comprising:
   a processor; and
   a memory storing machine executable instructions, the instructions when executed by the processor configure the apparatus to:
      receive an indication of a statistical model computed based on observations involving prior inter-satellite link acquisitions by a remote satellite, the statistical model configured to estimate future inter-satellite link acquisition times involving the remote satellite; and operate the statistical model, using the indication, for estimating said future inter-satellite link acquisition times involving the remote satellite.

22. The apparatus of claim 21, wherein the instructions when executed by the process further configure the apparatus to:

estimate the future inter-satellite link acquisition times based on the indication, data related to a first satellite, the remote satellite or other satellites in the satellite constellation, or both.

23. The apparatus of claim 22, wherein the data related to the first satellite, the remote satellite or the other satellites in the satellite constellation includes almanac data.

24. The apparatus of claim 21, wherein the instructions when executed by the process further configure the apparatus to:

estimate a probability for completion of an inter-satellite link acquisition involving the remote satellite at a specific time using the indication.

* * * * *